US012645370B2

(12) United States Patent
Hua et al.

(10) Patent No.: US 12,645,370 B2
(45) Date of Patent: Jun. 2, 2026

(54) ALGORITHMIC LOCATION OF RAID GROUPS AND SPARE CAPACITY FOR GRANULAR EXPANSION

(71) Applicant: Dell Products L.P., Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

( * ) Notice: Subject to any disclaimer, the term of this patent is extended or adjusted under 35 U.S.C. 154(b) by 146 days.

(21) Appl. No.: 18/897,045

(22) Filed: Sep. 26, 2024

(65) Prior Publication Data

US 2026/0086722 A1 Mar. 26, 2026

(51) Int. Cl.
*G06F 3/00* (2006.01)
*G06F 3/06* (2006.01)
(52) U.S. Cl.
CPC .......... *G06F 3/0619* (2013.01); *G06F 3/0647* (2013.01); *G06F 3/0689* (2013.01)

(58) Field of Classification Search
CPC ............. G06F 11/1666; G06F 11/1658; G06F 3/0619; G06F 3/0647; G06F 3/0689
See application file for complete search history.

(56) References Cited

U.S. PATENT DOCUMENTS

| | | | |
|---|---|---|---|
| 11,327,668 B1 * | 5/2022 | Hua ...................... | G06F 3/0659 |
| 2023/0052811 A1 * | 2/2023 | Hua .................... | G06F 11/1088 |

* cited by examiner

*Primary Examiner* — Reginald G Bragdon
*Assistant Examiner* — Michael L Westbrook
(74) *Attorney, Agent, or Firm* — Anderson Gorecki LLP

(57) ABSTRACT

A minimal cluster of G+1 disks with G same-size cells has protection group members distributed in accordance with a deterministic algorithm such that the cell at disk X, cell Y is assigned to group (X+Y−1) modulo M, where M is group size (G) plus 1 and one of the groups is reserved as spare capacity for recovering from drive failure. The cluster can be granularly expanded and eventually split into a non-flex cluster and a flex cluster that begins with the member distribution pattern of the deterministic algorithm. Relocations of members during expansion and split are achieved in part by submatrix transposition and reordering of disks.

20 Claims, 14 Drawing Sheets

RAID Protection Group 1

Storage Resource Pool 205

Production Storage Object 240

Minimal Cluster

| cell/disk | 1 | 2 | 3 | 4 | 5 | 6 |
|-----------|---|---|---|---|---|---|
| 1 | 1 | 2 | 3 | 4 | 5 | 0 |
| 2 | 2 | 3 | 4 | 5 | 0 | 1 |
| 3 | 3 | 4 | 5 | 0 | 1 | 2 |
| 4 | 4 | 5 | 0 | 1 | 2 | 3 |
| 5 | 5 | 0 | 1 | 2 | 3 | 4 |

Figure 3

| cell/disk | 1 | 2 | 3 | 4 | 5 | 6 | 7 | 8 | 9 |
|-----------|---|---|---|---|---|---|---|---|---|
| 1 | 6 | 6 | 6 | 6 | 6 | 0 | 1 | 2 | 3 |
| 2 | 7 | 7 | 7 | 7 | 7 | 1 | 2 | 3 | 4 |
| 3 | 8 | 8 | 8 | 8 | 8 | 2 | 3 | 4 | 5 |
| 4 | 4 | 5 | 0 | 1 | 2 | 3 | 4 | 5 | 0 |
| 5 | 5 | 0 | 1 | 2 | 3 | 4 | 5 | 0 | 1 |

Figure 4

| cell/disk | 1 | 2 | 3 | 4 | 5 | 6 | 7 | 8 | 9 |
|---|---|---|---|---|---|---|---|---|---|
| 1 | 6 | 6 | 6 | 6 | 6 | 6 | 1 | 2 | 3 |
| 2 | 7 | 7 | 7 | 7 | 7 | 1 | 2 | 3 | 4 |
| 3 | 8 | 8 | 8 | 8 | 8 | 2 | 3 | 4 | 5 |
| 4 | 4 | 5 | 2 | 1 | 2 | 3 | 4 | 5 | 8 |
| 5 | 5 | 1 | 1 | 2 | 3 | 4 | 5 | 7 | 1 |

Figure 5

| cell/disk | 1 | 2 | 3 | 4 | 5 | 6 |
|---|---|---|---|---|---|---|
| 1 | 1 | 2 | 3 | 4 | 5 | 0 |
| 2 | 2 | 3 | 4 | 5 | 0 | 1 |
| 3 | 3 | 4 | 5 | 0 | 1 | 2 |
| 4 | 4 | 5 | 0 | 1 | 2 | 3 |
| 5 | 5 | 0 | 1 | 2 | 3 | 4 |

Expanding Minimal Cluster By Reordering Disks

| cell/disk | 1 | 2 | 3 | 4 | 5 | 6 | 7 | 8 | 9 |
|---|---|---|---|---|---|---|---|---|---|
| 1 | | | | 4 | 5 | 0 | 1 | 2 | 3 |
| 2 | | | | 5 | 0 | 1 | 2 | 3 | 4 |
| 3 | | | | 0 | 1 | 2 | 3 | 4 | 5 |
| 4 | | | | 1 | 2 | 3 | 4 | 5 | 0 |
| 5 | | | | 2 | 3 | 4 | 5 | 0 | 1 |

Figure 6

Expanding Minimal Cluster By Swapping Disk/Cell Indices

| cell/disk | 1 | 2 | 3 | 4 | 5 | 6 | 7 | 8 | 9 |
|---|---|---|---|---|---|---|---|---|---|
| 1 | | | | 4 | 5 | 0 | 1 | 2 | 3 |
| 2 | | | | 5 | 0 | 1 | 2 | 3 | 4 |
| 3 | | | | 0 | 1 | 2 | 3 | 4 | 5 |
| 4 | | | | 1 | 2 | 3 | 4 | 5 | 0 |
| 5 | | | | 2 | 3 | 4 | 5 | 0 | 1 |

| cell/disk | 1 | 2 | 3 | 4 | 5 | 6 | 7 | 8 | 9 |
|---|---|---|---|---|---|---|---|---|---|
| 1 | 6 | 6 | 6 | 6 | 6 | 0 | 1 | 2 | 3 |
| 2 | 7 | 7 | 7 | 7 | 7 | 1 | 2 | 3 | 4 |
| 3 | 8 | 8 | 8 | 8 | 8 | 2 | 3 | 4 | 5 |
| 4 | 4 | 5 | 0 | 1 | 2 | 3 | 4 | 5 | 0 |
| 5 | 5 | 0 | 1 | 2 | 3 | 4 | 5 | 0 | 1 |

Figure 7

Expanding an Unexpanded Cluster Until a Split

| cell/disk | 1 | 2 | 3 | 4 | 5 | 6 | 7 | 8 | 9 | 10 | 11 |
|-----------|---|---|---|---|---|---|---|---|---|----|----|
| 1 | 6 | 6 | 6 | 6 | 6 | 0 | 1 | 2 | 3 |  |  |
| 2 | 7 | 7 | 7 | 7 | 7 | 1 | 2 | 3 | 4 |  |  |
| 3 | 8 | 8 | 8 | 8 | 8 | 2 | 3 | 4 | 5 |  |  |
| 4 | 4 | 5 | 0 | 1 | 2 | 3 | 4 | 5 | 0 |  |  |
| 5 | 5 | 0 | 1 | 2 | 3 | 4 | 5 | 0 | 1 |  |  |

| cell/disk | 1 | 2 | 3 | 4 | 5 |
|-----------|---|---|---|---|---|
| 1 | 6 | 6 | 6 | 6 | 6 |
| 2 | 7 | 7 | 7 | 7 | 7 |
| 3 | 8 | 8 | 8 | 8 | 8 |
| 4 | 9 | 9 | 9 | 9 | 9 |
| 5 | 10 | 10 | 10 | 10 | 10 |

| | 1 | 2 | 3 | 4 | 5 | 6 |
|--|---|---|---|---|---|---|
| | 1 | 2 | 3 | 4 | 5 | 0 |
| | 2 | 3 | 4 | 5 | 0 | 1 |
| | 3 | 4 | 5 | 0 | 1 | 2 |
| | 4 | 5 | 0 | 1 | 2 | 3 |
| | 5 | 0 | 1 | 2 | 3 | 4 |

Figure 8

Expanding Beyond a Split

| cell/disk | 1 | 2 | 3 | 4 | 5 | 6 | 7 | 8 | 9 | 10 |
|---|---|---|---|---|---|---|---|---|---|---|
| 1 | 6 | 6 | 6 | 6 | 6 | 0 | 1 | 2 | 3 | 4 |
| 2 | 7 | 7 | 7 | 7 | 7 | 1 | 2 | 3 | 4 | 5 |
| 3 | 8 | 8 | 8 | 8 | 8 | 2 | 3 | 4 | 5 | 0 |
| 4 | 9 | 9 | 9 | 9 | 9 | 3 | 4 | 5 | 0 | 1 |
| 5 | 5 | 0 | 1 | 2 | 3 | 4 | 5 | 0 | 1 | 2 |

| cell/disk | 1 | 2 | 3 | 4 | 5 |
|---|---|---|---|---|---|
| 1 | 6 | 6 | 6 | 6 | 6 |
| 2 | 7 | 7 | 7 | 7 | 7 |
| 3 | 8 | 8 | 8 | 8 | 8 |
| 4 | 9 | 9 | 9 | 9 | 9 |
| 5 | 10 | 10 | 10 | 10 | 10 |

| | 7 | 8 | 9 | 10 | 11 | 6 |
|---|---|---|---|---|---|---|
| 1 | 1 | 2 | 3 | 4 | 5 | 0 |
| 2 | 2 | 3 | 4 | 5 | 0 | 1 |
| 3 | 3 | 4 | 5 | 0 | 1 | 2 |
| 4 | 4 | 5 | 0 | 1 | 2 | 3 |
| 5 | 5 | 0 | 1 | 2 | 3 | 4 |

Figure 9

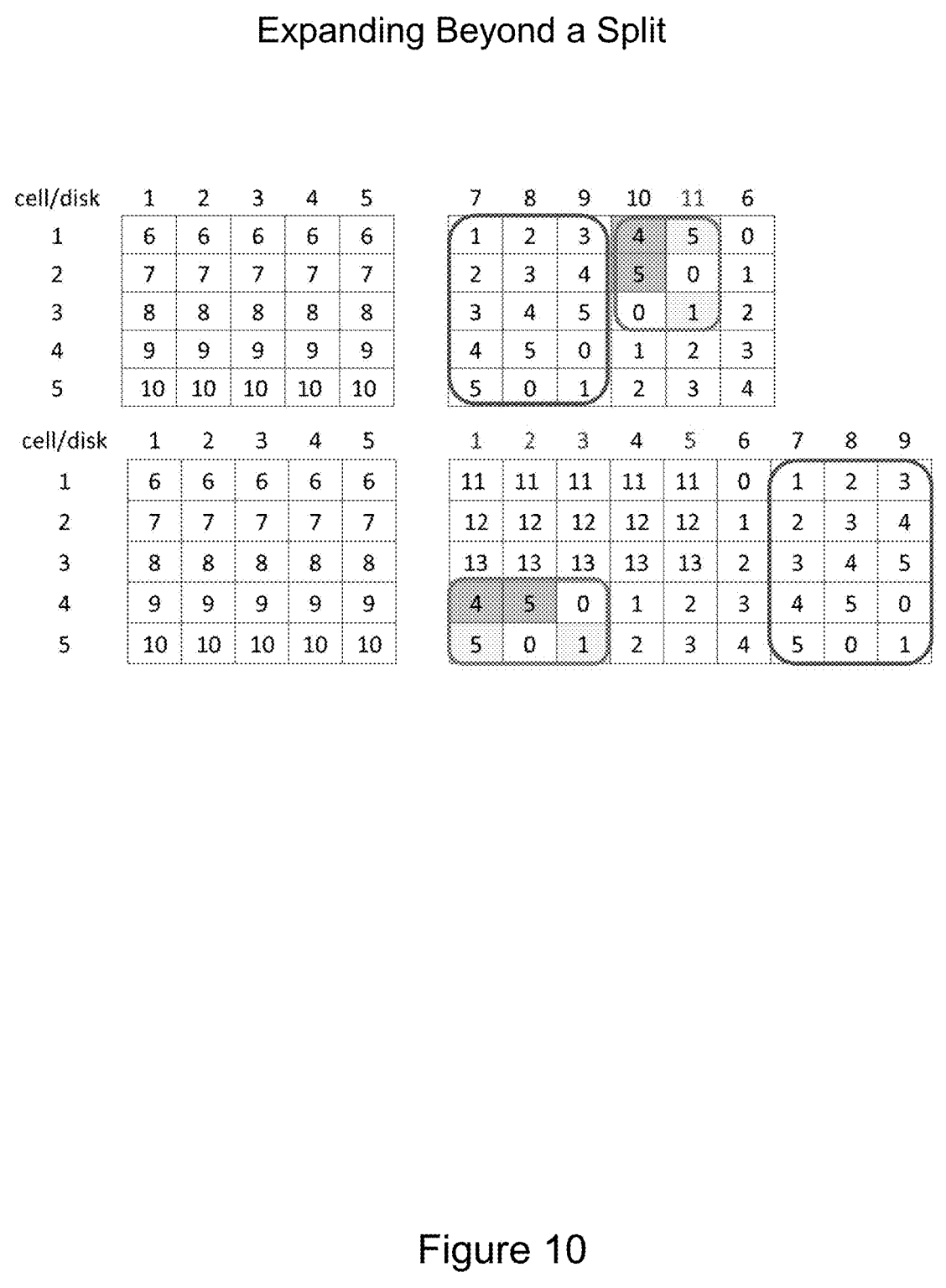

Expanding Beyond a Split

| cell/disk | 1 | 2 | 3 | 4 | 5 |
|---|---|---|---|---|---|
| 1 | 6 | 6 | 6 | 6 | 6 |
| 2 | 7 | 7 | 7 | 7 | 7 |
| 3 | 8 | 8 | 8 | 8 | 8 |
| 4 | 9 | 9 | 9 | 9 | 9 |
| 5 | 10 | 10 | 10 | 10 | 10 |

| | 7 | 8 | 9 | 10 | 11 | 6 |
|---|---|---|---|---|---|---|
| | 1 | 2 | 3 | 4 | 5 | 0 |
| | 2 | 3 | 4 | 5 | 0 | 1 |
| | 3 | 4 | 5 | 0 | 1 | 2 |
| | 4 | 5 | 0 | 1 | 2 | 3 |
| | 5 | 0 | 1 | 2 | 3 | 4 |

| cell/disk | 1 | 2 | 3 | 4 | 5 |
|---|---|---|---|---|---|
| 1 | 6 | 6 | 6 | 6 | 6 |
| 2 | 7 | 7 | 7 | 7 | 7 |
| 3 | 8 | 8 | 8 | 8 | 8 |
| 4 | 9 | 9 | 9 | 9 | 9 |
| 5 | 10 | 10 | 10 | 10 | 10 |

| | 1 | 2 | 3 | 4 | 5 | 6 | 7 | 8 | 9 |
|---|---|---|---|---|---|---|---|---|---|
| | 11 | 11 | 11 | 11 | 11 | 0 | 1 | 2 | 3 |
| | 12 | 12 | 12 | 12 | 12 | 1 | 2 | 3 | 4 |
| | 13 | 13 | 13 | 13 | 13 | 2 | 3 | 4 | 5 |
| | 4 | 5 | 0 | 1 | 2 | 3 | 4 | 5 | 0 |
| | 5 | 0 | 1 | 2 | 3 | 4 | 5 | 0 | 1 |

Figure 10

CREATE MINIMAL DRIVE CLUSTER OF (G+1) DRIVES
400

CREATE G SAME-SIZE CELLS ON EACH DRIVE
402

ASSIGN CELL AT DISK X CELL Y TO
GROUP (X+Y-1) MODULO (M), WHERE M = G +1
404

RESERVE GROUP 0 AS SPARES
406

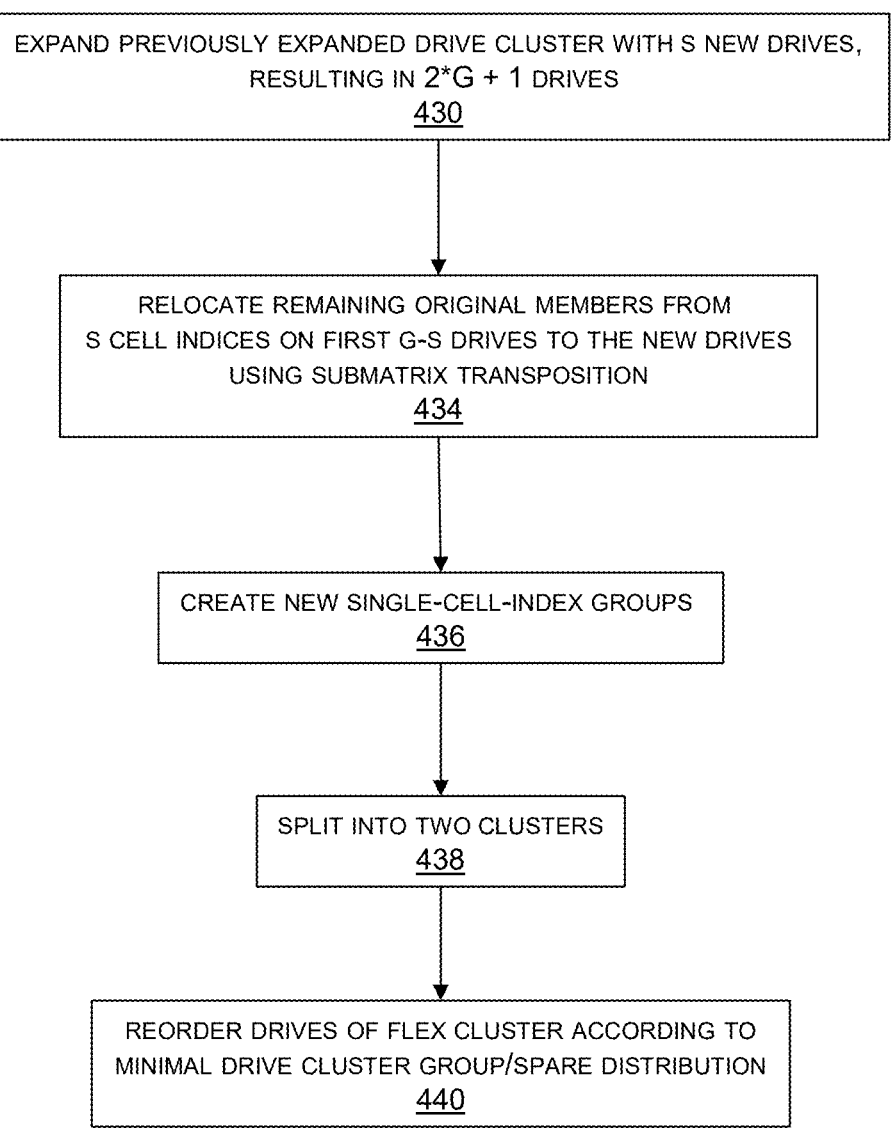

EXPAND PREVIOUSLY EXPANDED DRIVE CLUSTER WITH S NEW DRIVES,
RESULTING IN 2*G + 1 DRIVES
430

RELOCATE REMAINING ORIGINAL MEMBERS FROM
S CELL INDICES ON FIRST G-S DRIVES TO THE NEW DRIVES
USING SUBMATRIX TRANSPOSITION
434

CREATE NEW SINGLE-CELL-INDEX GROUPS
436

SPLIT INTO TWO CLUSTERS
438

REORDER DRIVES OF FLEX CLUSTER ACCORDING TO
MINIMAL DRIVE CLUSTER GROUP/SPARE DISTRIBUTION
440

Figure 13

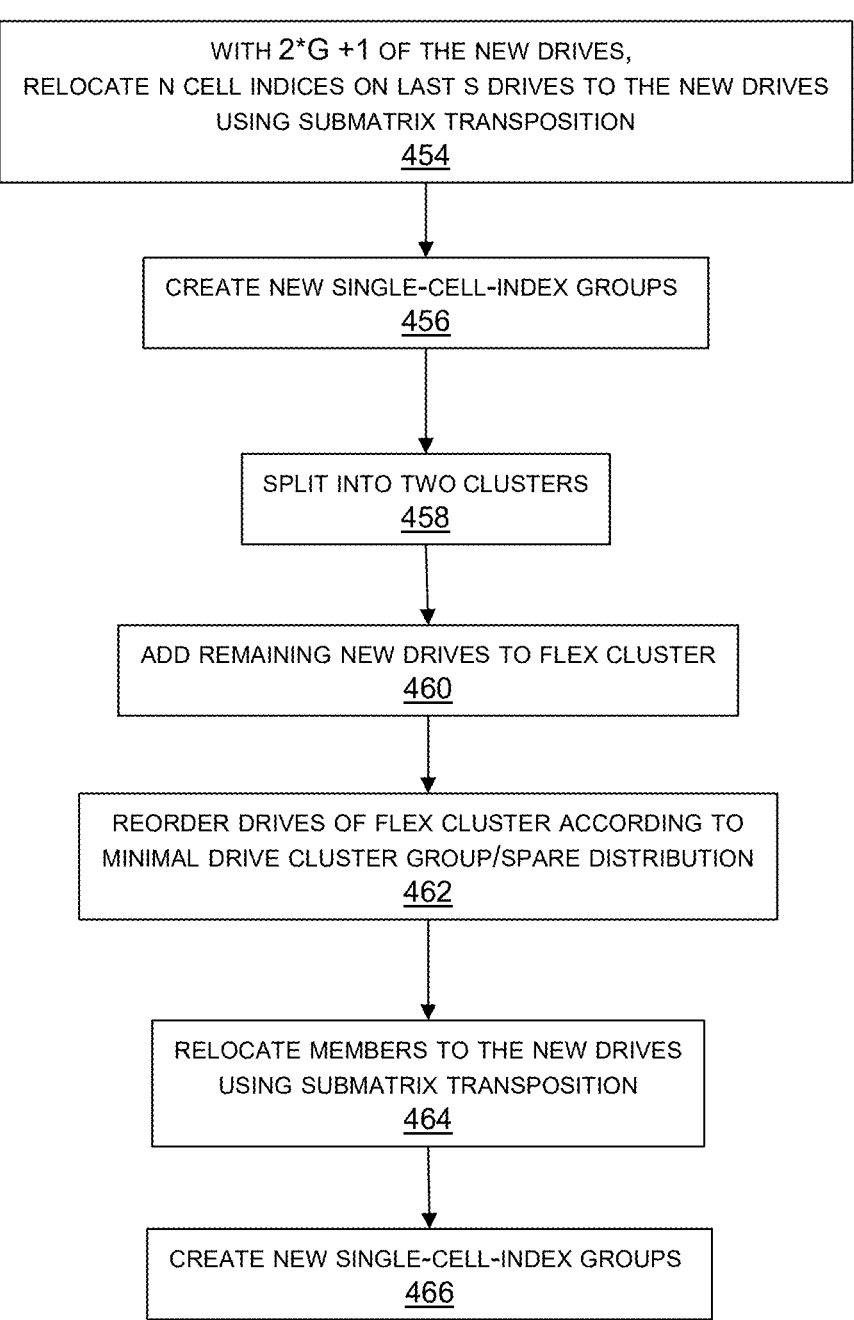

WITH 2*G +1 OF THE NEW DRIVES,
RELOCATE N CELL INDICES ON LAST S DRIVES TO THE NEW DRIVES
USING SUBMATRIX TRANSPOSITION
454

CREATE NEW SINGLE-CELL-INDEX GROUPS
456

SPLIT INTO TWO CLUSTERS
458

ADD REMAINING NEW DRIVES TO FLEX CLUSTER
460

REORDER DRIVES OF FLEX CLUSTER ACCORDING TO
MINIMAL DRIVE CLUSTER GROUP/SPARE DISTRIBUTION
462

RELOCATE MEMBERS TO THE NEW DRIVES
USING SUBMATRIX TRANSPOSITION
464

CREATE NEW SINGLE-CELL-INDEX GROUPS
466

Figure 14

ALGORITHMIC LOCATION OF RAID GROUPS AND SPARE CAPACITY FOR GRANULAR EXPANSION

TECHNICAL FIELD

The subject matter of this disclosure is generally related to electronic data storage.

BACKGROUND

Redundant Array of Independent Drives (RAID) protection groups help to avoid data loss in electronic data storage systems by enabling reconstruction of a failed protection group member using the remaining members of the protection group. A RAID-L (D+P) protection group has D data members and P parity members that define a group size (G) and width of (D+P) for RAID level L. For example, RAID-5 (4+1) is characterized by D=4, P=1, and G=5. The data members store data. The parity members store parity information such as XORs of the data values. The parity information enables reconstruction of the data in the event that a data member fails. The data members enable reconstruction of the parity information in the event that a parity member fails. Each member of a RAID protection group is maintained on a different disk drive to enable reconstruction after a member is lost due to drive failure. It is generally desirable to support granular expansion, i.e., in increments of fewer than G drives, of the storage capacity of a drive array.

SUMMARY

A method in accordance with some implementations comprises creating a minimal drive cluster of protection groups with G members, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure; expanding the minimal drive cluster with N new drives, resulting in an expanded cluster have a total of less than 2*G+1 drives; reordering the new drives with the first N drives of the minimal drive cluster by swapping disk indices; freeing cells at N cell indices of the first G-N drives using member transposition; and creating single-cell-index groups in the freed cells. An apparatus in accordance with some implementations comprises a plurality of non-volatile drives; a plurality of interconnected compute nodes that manage access to the drives; and a drive manager configured to: create a minimal drive cluster of protection groups of size G, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure; expand the minimal drive cluster with N new drives, resulting in an expanded cluster have a total of less than 2*G+1 drives; reorder the new drives with the first N drives of the minimal drive cluster by swapping disk indices; free cells at N cell indices of the first G-N drives using member transposition; and create single-cell-index groups in the freed cells. In accordance with some implementations, a computer-readable storage medium stores instructions that when executed by a computer cause the computer to perform a method comprising creating a minimal drive cluster of protection groups of size G, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure; expanding the minimal drive cluster with N new drives, resulting in an expanded cluster have a total of less than 2*G+1 drives; reordering the new drives with the first N drives of the minimal drive cluster by swapping disk indices; freeing cells at N cell indices of the first G-N drives using member transposition; and creating single-cell-index groups in the freed cells.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 3 illustrates a minimal drive cluster.

FIG. 4 illustrates an expanded drive cluster.

FIG. 5 illustrates spare coverage in the expanded drive cluster.

FIG. 6 illustrates achieving deterministic member location during expansion by reordering disks.

FIG. 7 illustrates completion of expansion of the drive cluster of FIG. 6 using submatrix transposition.

FIG. 8 illustrates expansion of an unexpanded cluster until a split using both transposition of members and reordering of disks.

FIGS. 9 and 10 illustrate expansion beyond a split using iterative transposition of members and reordering of disks.

FIG. 13 illustrates a method for expanding and splitting a minimal drive cluster by transposition and reordering of disks.

FIG. 14 illustrates a method for expansion beyond a split by iterative transposition and reordering of disks.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

Figure 1:
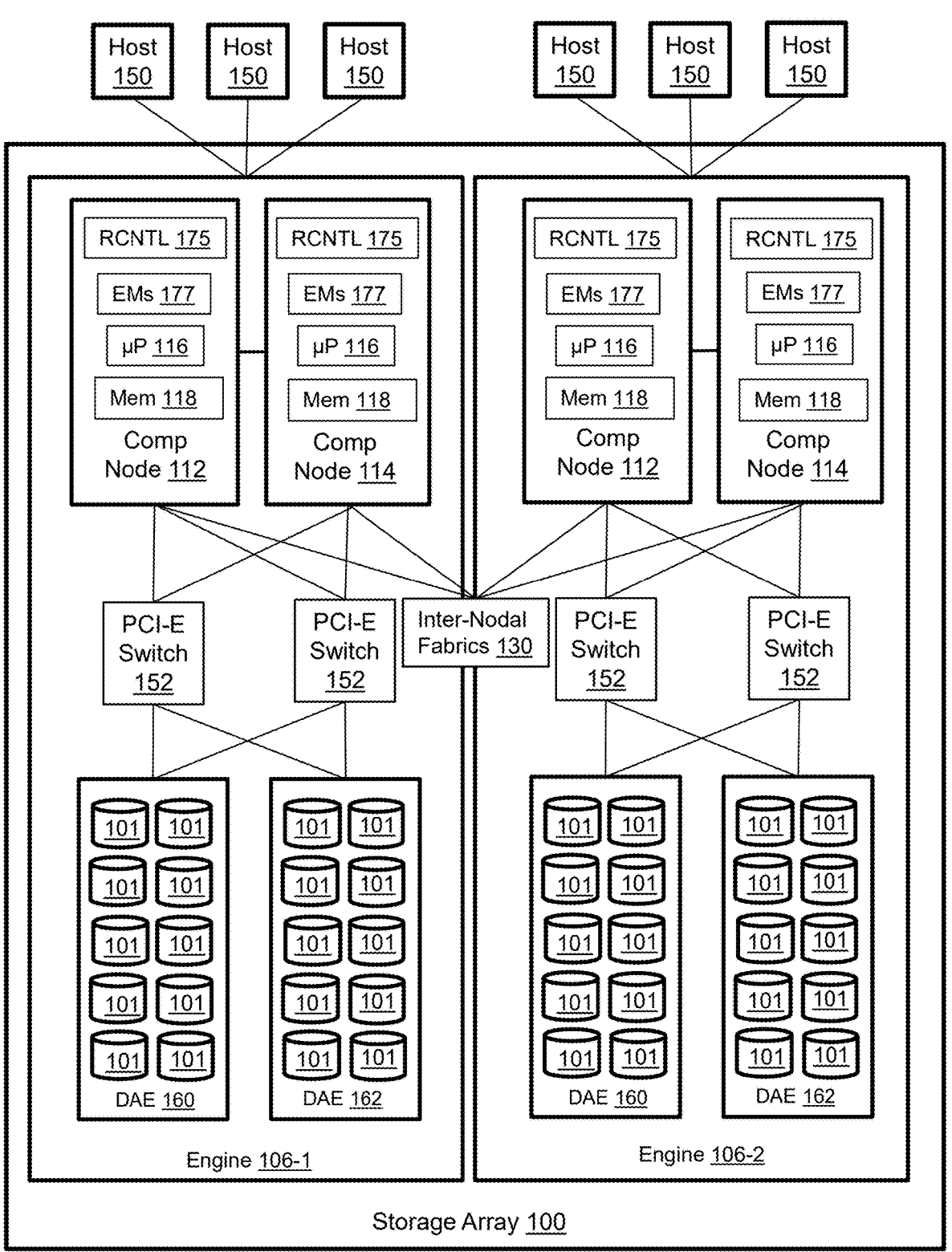
FIG. 1 illustrates a storage array with drive managers that are configured to deterministically relocate protection group members and spares to support granular expansion of storage capacity.

FIG. 1 illustrates a storage array with drive managers (aka RAID controllers) 175 that are configured to predictably relocate protection group members and spares to support granular expansion of storage capacity by adding new drives. The illustrated storage array includes two engines 106-1, 106-2. However, the storage array might include any number of engines. Each engine includes two disk array enclosures (DAEs) 160, 162 and a pair of peripheral component interconnect express (PCI-e) interconnected compute nodes 112, 114 (also known as storage directors) in a failover relationship. Within each engine, the compute nodes and DAEs are interconnected via redundant PCI-e switches 152. Each DAE includes managed drives 101 that are non-volatile storage media that may be of any type, e.g., solid-state drives (SSDs) based on nonvolatile memory express (NVMe) and EEPROM technology such as NAND and NOR flash memory. Each compute node is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Each compute node 112, 114 runs emulations (EMs 177) for performing different storage-related tasks and functions. Front-end emulations handle communications with the host servers 150. For example, front-end emulations receive IO commands from host servers and return data and write acknowledgements to the host servers. Back-end emulations handle communications with managed drives 101 in the DAEs 160, 162. Data services emulations process IOs. Remote data services emulations handle communications with other storage systems, e.g., other storage arrays for remote replication and remote snapshot creation. Drive managers 175 may include one or more of: special purpose electronic components, logic, and computer program code loaded into memory 118 from the managed drives 101 and run on the processors 116.

Figure 2:
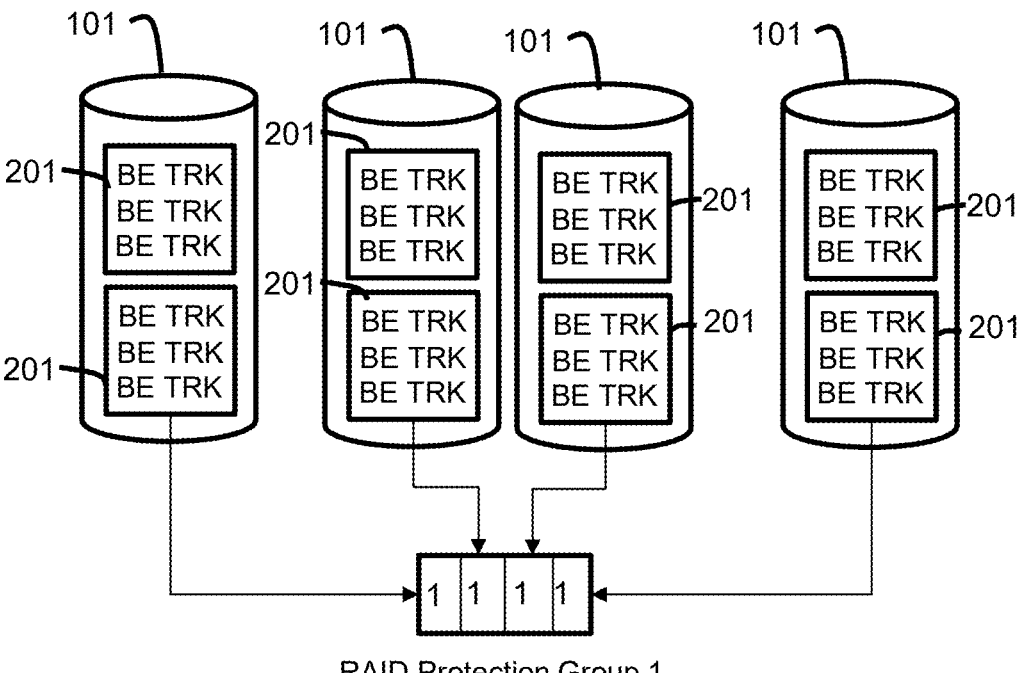
FIG. 2 illustrates layers of abstraction between the managed drives and the production storage object of the storage array of FIG. 1.
Figure 2:
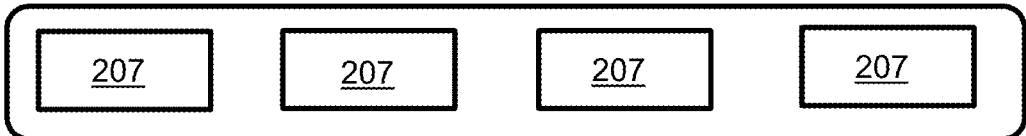
Figure 2:
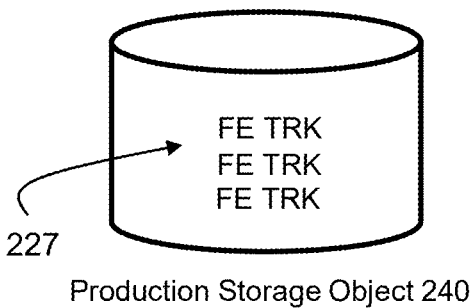

Referring to FIGS. 1 and 2, data that is created and used by instances of the host applications running on the host servers 150 is maintained on the managed drives 101. The managed drives are not discoverable by the host servers 150, so the storage array creates logical production storage objects such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata that maps between the LBAs of the production storage object 240 and physical addresses on the managed drives 101 in order to process IOs from the host servers. Each production storage object is uniquely associated with a single host application. The storage array may maintain a plurality of production storage objects and simultaneously support multiple host applications.

The basic allocation unit of storage capacity that is used by the compute nodes 112, 114 to access the managed drives is a back-end track (BE TRK). The managed drives are organized into same-size units of storage capacity referred to herein as cells 201, each of which may contain multiple BE TRKs. Although individual drives can be configured as RAID group members, in the illustrated example a cell grouping containing cells 201 from different managed drives is used to create a RAID protection group 1, such as a RAID-5 (3+1) protection group, in which each member is referenced as 1. In order to be RAID-compliant, each member of a given protection group must be on a different managed drive. In the illustrated example, each cell 201 contains one member of protection group "1" stored on a particular managed drive. Other protection groups, e.g., 2, 3, 4, and so forth, would be similarly formed. Storage resource pool 205 is a type of storage object that includes a collection of protection groups of the same RAID level. The host application data is logically stored in front-end tracks (FE TRKs) on production volume 240. The FE TRKs of the production volume are mapped to the BE TRKs on the managed drives and vice versa by tables and pointers that are maintained in the shared memory.

FIG. 3 illustrates a minimal drive cluster represented as a matrix of sequentially numbered disk index columns and cell index rows. The storage capacity of the storage array is organized into one or more drive clusters. A "flex-cluster" is initialized as a minimal drive cluster and may be expanded and eventually split into two separate clusters. The minimal drive cluster has (G+1) drives that each have G same-size cells, where G=(group size). The specifically illustrated example is a RAID-5 (4+1), so each of 6 drives (indexed 1 through 6) is organized into 5 same-size cells (indexed 1 through 5). RAID protection groups are sequentially referenced with numbers 0, 1, 2, 3, and so forth, in the cell in which the corresponding protection group member is located. Distribution of members in the minimal cluster is deterministic in accordance with a modulo algorithm. More specifically, the cell at disk X, cell Y is assigned to group (X+Y−1) modulo M, where M=(group size+1). Group 0 is reserved as spare capacity for rebuilding failed group members.

FIG. 4 illustrates an expanded drive cluster. The expanded drive cluster contains more than (G+1) drives and less than 2*G+1 drives, which is the number of drives required to split a flex cluster into a minimal cluster and a non-flex cluster. The new drives are sequentially indexed relative to the original drives of the minimal cluster. A number of sequential cell indices equal to the number of new drives over a number of sequential drive indices equal to the group size are depopulated of members (including spares) by deterministic algorithmic relocations. More specifically, the protection group members and spares are relocated to cells of the new drives according to the deterministic algorithm that assigns the cell at disk X, cell Y to group (X+Y−1) modulo M. New single-cell-index protection groups are created in the submatrix of freed space. In the illustrated example, new disks 7, 8, 9 are added and new groups 6, 7, 8 are created in cell indices 1, 2, 3 of disks 1-5, respectively. The deterministic modulo algorithm is not applied to the new single-cell-index protection groups 6, 7, 8.

FIG. 5 illustrates spare coverage in the expanded drive cluster. Redistribution of the spare capacity (group 0) in accordance with the deterministic algorithm maintains a suitable distribution of spare cells to enable recovery from failure of any disk in the cluster. If disk 4 fails, for example, its affected group members (6, 7, 8, 1, 2) are sorted in ascending order (1, 2, 6, 7, 8) and rebuilt at spare cells in ascending disk order as shown.

FIG. 6 illustrates achieving deterministic member location during expansion by reordering disks. A minimal cluster of disks 1-6 is expanded by adding new disks 7-9. The group members and spares in cells 1-5 of disks 1-3 could be relocated to the new disks in accordance with the deterministic algorithm. However, for the illustrated minimal cluster of RAID-5 (4+1) and modulo (6), the disk indices differ by 6 so it is more efficient to swap disk indices to reorder disks 7-9 as disks 1-3. In other words, disks 1-3 are re-indexed as disks 7-9 and the new disks are indexed as disks 1-3. Swapping disk indices is more efficient than data relocation, so it is used when the resulting member locations agree with the deterministic algorithm.

FIG. 7 illustrates completion of expansion of the drive cluster of FIG. 6 using submatrix transposition (swapping member disk/cell indices). Having formed populated disks index 7 through 9 by reordering disk indices as described with reference to FIG. 6, members in the cells at indices 1-3 of disks 4 and 5 are relocated so that new single-cell-index protection groups can be created in the resulting submatrix of free cells. The group members in cells 1-3 of disks 4-5 are relocated by swapping disk and cell indices. For example, the group member (4) at cell 1, disk 4 is relocated to cell 4 of disk 1. Similarly, the group member (1) at cell 3, disk 5 is relocated to cell 5 of disk 3. The locations resulting from transposition are the same as the locations resulting from the deterministic algorithm. New single-cell-index groups 6-8 are created after the cells are vacated.

FIG. 8 illustrates expansion of an unexpanded cluster until a split using both transposition of member locations and reordering of disks. Two new disks (10-11) are added to a nine-disk expanded cluster, resulting in a sufficient number of disks (2*G+1 drives) to support a cluster split into a minimal cluster and a non-flex cluster. In order to free cells to create new single-cell-index protection groups on the first G-N disks that will become the non-flex cluster, the remaining original members of the minimal cluster are relocated to the new disks. More specifically, the members are relocated using submatrix transposition. The members of the lowest-indexed cell of the submatrix are relocated to the lowest-indexed new drive with disk indices swapped for cell indices. The members of the second-lowest-indexed cell of the submatrix are relocated to the second-lowest indexed new drive with disk indices swapped for cell indices, and so forth. New single-cell-index groups 9 and 10 are created in the freed cells 4-5 of disks 1-5. Disks 1-5 are then split-away as a separate non-flex cluster that contains only single-cell-index groups and no spares. Disks 7-11 are reordered as disks 1-5, with disks 7-9 becoming disks 1-3, disks 10-11 becoming disks 4-5, and disk 6 remaining as disk 6, resulting in a flex cluster that has the minimal cluster group member distribution in accordance with the deterministic algorithm.

FIGS. 9 and 10 illustrate expansion beyond a split using iterative transposition of members and reordering of disks. Four new disks are added to a ten-disk expanded cluster, resulting in greater than 2*G+1 drives. The cluster is split after addition of the first new disk (11). Transposition is used to relocate members from cell 5 of disks 1-5 to disk 11. Single-cell-index group 10 is created in the vacated cells. Disks 1-5 are then split away as a separate non-flex cluster from disks 6-11. As shown in FIG. 10, the other three new disks are then added as disks 1-3 and disks 10-11 are reordered as disks 4-5. Members in cells 1-3 of disks 4-5 (formerly 10-11) are relocated to cells 4-5 of disks 1-3 using transposition. New single-cell-index groups 11, 12, 13 are created in cells 1-3 of disks 1-5.

FIGS. 11 through 14 illustrate steps of methods performed by the drive managers (RAID controllers) running on the storage directors.

Figure 11:
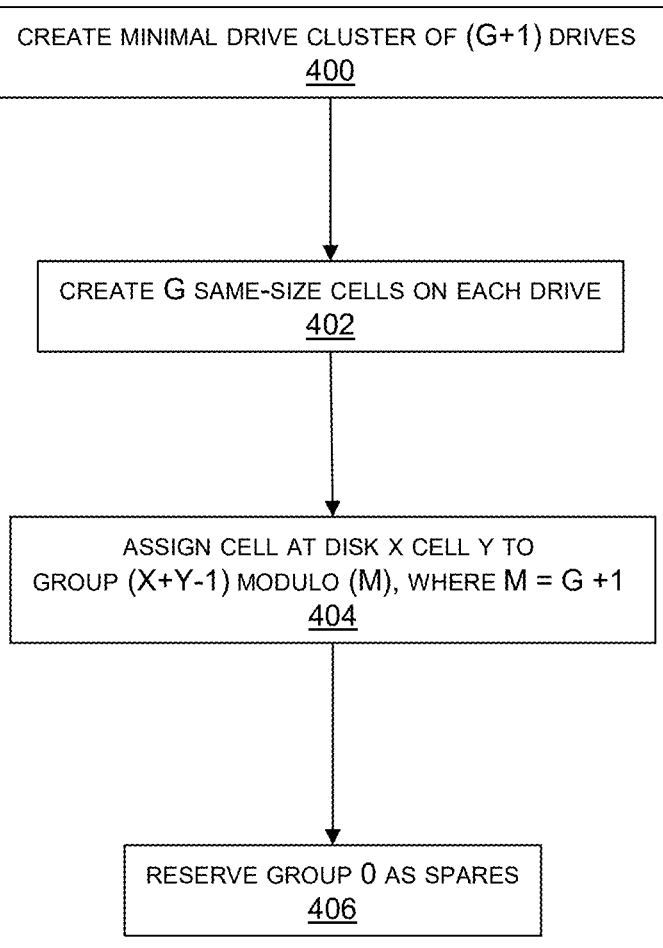
FIG. 11 illustrates a method for locating group members in a minimal drive cluster.

FIG. 11 illustrates a method for locating group members in a minimal drive cluster. Step 400 is creating a minimal cluster from G+1 drives. Step 402 is creating G same-size cells on each drive. In step 404 the cells are assigned to sequentially referenced group members such that the cell at disk X, cell Y is assigned to group (X+Y−1) modulo (M), where M=G+1. As indicated in step 406, group 0 is reserved as spares for recovering from disk failure.

Figure 12:
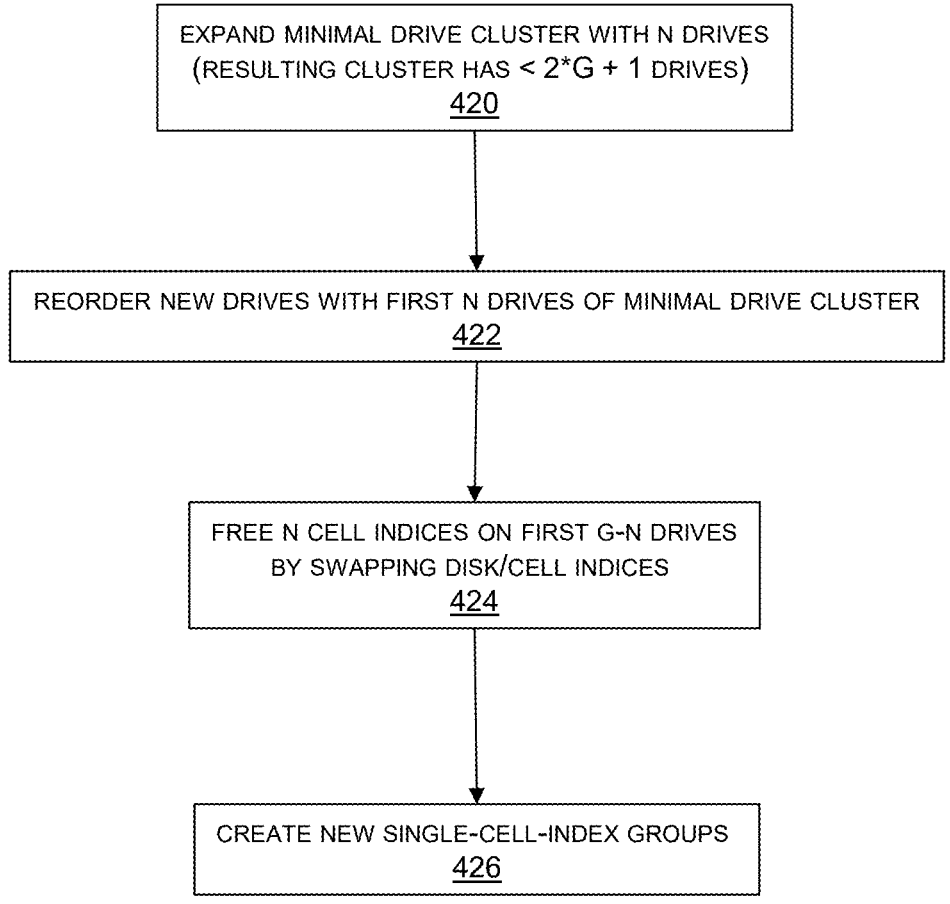
FIG. 12 illustrates a method for expanding a minimal drive cluster by transposition and reordering of disks.

FIG. 12 illustrates a method for expanding a minimal drive cluster using both transposition and reordering of disks. Step 420 is expanding a minimal drive cluster with the addition of N drives, resulting in a cluster that has less than 2*G+1 drives. Step 422 is reordering the N new drives with the lowest-indexed N drives of the minimal drive cluster by swapping disk indices. As previously explained, this achieves compliance with the deterministic algorithm member distribution without movement of members. Step 424 is freeing cells at N cell indices of the first G-N drives, where G is the group size. This is accomplished using member transposition (swapping disk/cell indices). The result is a free submatrix of cells in which new single-cell-index groups are created as indicated in step 426.

FIG. 13 illustrates a method for expanding and splitting a minimal drive cluster by transposition and reordering of disks. A previously expanded drive cluster is expanded with S new drives, resulting in exactly 2*G+1 drives as indicated in step 430. Step 434 is relocating the remaining original members from S cell indices on the first G-S drives to the new drives using submatrix transposition. New single-cell-index protection groups are created in the freed cells as indicated in step 436. The cluster is then split into two clusters as indicated in step 438. The first cluster of the two clusters is a non-flex cluster with only single-cell-index groups. The second cluster of the two clusters becomes a minimal cluster. Step 440 is reordering the drives of the second cluster to match member distribution according to the deterministic algorithm.

FIG. 14 illustrates a method for expansion beyond a split by iterative transposition and reordering of disks. A previously expanded drive cluster is expanded with S new drives, resulting in greater than 2*G+1 drives. With 2*G+1 of the new drives, the remaining original members are relocated from cell indices on the first G drives to the new drives using submatrix transposition as indicated in step 454. New single-cell-index protection groups are created in the freed cells as indicated in step 456. The cluster is then split into two clusters as indicated in step 458. The first cluster of the two clusters is a non-flex cluster with only single-cell-index groups. The second cluster of the two clusters becomes a flex cluster. Step 460 is adding the remaining new drives to the second cluster. Step 462 is reordering the drives of the second cluster to match member distribution according to the deterministic algorithm. Step 464 is relocating members to the new drives using submatrix transposition to free cells for creation of single-cell-index protection groups. The number and location of members to be relocated is determined by the number of remaining new disks. Step 466 is creating single-cell-index protection groups in the freed cells.

Although advantages are not to be viewed as limitations, at least some implementations benefit from using the same computational algorithm to locate the members of all groups in flex clusters, including data and spare capacity. The algorithm is based on modulo computation that works with disk reordering and disk/cell index swapping for cluster expansion. When an expanded Flex cluster grows to 2*(group size)+1 disks, it will split off a minimal Flex cluster with spares and a non-flex cluster. Thus, granular expansion and splitting can be iterated.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims. For example, and without limitation, the concepts disclosed herein may be applied to Erasure Coding with D data members and P parity members, where the group size G=D+P.

What is claimed is:

1. A method, comprising:
creating a minimal drive cluster of protection groups With G members, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure;

expanding the minimal drive cluster with N new drives, resulting in an expanded cluster have a total of less than 2*G+1 drives;
reordering the new drives with the first N drives of the minimal drive cluster by swapping disk indices;
freeing cells at N cell indices of the first G-N drives using member transposition; and
creating single-cell-index groups in the freed cells.

2. The method of claim 1 further comprising expanding the expanded drive cluster with S new drives, resulting in exactly 2*G+1 drives, and freeing cells by relocating remaining original members from S cell indices on the first G drives to the new drives using submatrix transposition.

3. The method of claim 2 further comprising creating new single-cell-index protection groups in the freed cells.

4. The method of claim 3 further comprising splitting the drive cluster into two split-away clusters and reordering the drives of one of the split-away clusters such that the cell at disk X, cell Y is assigned to group (X+Y−1) modulo M.

5. The method of claim 1 further comprising expanding the expanded drive cluster with S new drives, resulting in greater than 2*G+1 drives, and freeing cells by relocating remaining original members from S cell indices on the first G drives to the new drives using submatrix transposition.

6. The method of claim 5 further comprising creating new single-cell-index protection groups in the freed cells and splitting the drive cluster into two split-away clusters.

7. The method of claim 6 further comprising adding the remaining new drives to a first split-away cluster of the split-away clusters, reordering the drives of the first split-away cluster such that the cell at disk X, cell Y is assigned to group (X+Y−1) modulo M, freeing cells by relocating remaining original members from S cell indices on the first G-S drives to the new drives using submatrix transposition, and creating new single-cell-index protection groups are created in the freed cells.

8. An apparatus, comprising:
a plurality of non-volatile drives;
a plurality of interconnected compute nodes that manage access to the drives; and
a drive manager configured to:
create a minimal drive cluster of protection groups of size G, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure;
expand the minimal drive cluster with N new drives, resulting in an expanded cluster have a total of less than 2*G+1 drives;
reorder the new drives with the first N drives of the minimal drive cluster by swapping disk indices;
free cells at N cell indices of the first G-N drives using member transposition; and
create single-cell-index groups in the freed cells.

9. The apparatus of claim 8 further comprising the drive manager configured to expand the expanded drive cluster with S new drives, resulting in exactly 2*G+1 drives, and free cells by relocating remaining original members from S cell indices on the first W drives to the new drives using submatrix transposition.

10. The apparatus of claim 9 further comprising the drive manager configured to create new single-cell-index protection groups in the freed cells.

11. The apparatus of claim 10 further comprising the drive manager configured to split the drive cluster into two split-away clusters and reorder the drives of one of the split-away clusters such that the cell at disk X, cell Y is assigned to group (X+Y−1) modulo M.

12. The apparatus of claim 8 further comprising the drive manager configured to expand the expanded drive cluster with S new drives, resulting in greater than 2*G+1 drives, and free cells by relocating remaining original members from S cell indices on the first G drives to the new drives using submatrix transposition.

13. The apparatus of claim 12 further comprising the drive manager configured to create new single-cell-index protection groups in the freed cells and split the drive cluster into two split-away clusters.

14. The apparatus of claim 13 further comprising the drive manager configured to add the remaining new drives to a first split-away cluster of the split-away clusters, reorder the drives of the first split-away cluster such that the cell at disk X, cell Y is assigned to group (X+Y−1) modulo M, free cells by relocating remaining original members from S cell indices on the first G-S drives to the new drives using submatrix transposition, and create new single-cell-index protection groups are created in the freed cells.

15. A non-transitory computer-readable storage medium storing instructions that when executed by a computer cause the computer to perform a method for using a computer system to create and distribute spare capacity, the method comprising:

creating a minimal drive cluster of protection groups With G members, the minimal drive cluster characterized by (G+1) drives that are each organized into G same-size cells for which the cell at disk X, cell Y is assigned to group (X+Y−1) modulo M, where M is group size (G) plus 1 and one of the groups is reserved as spare capacity for recovering from drive failure;

expanding the minimal drive cluster with N new drives, resulting in an expanded cluster have a total of less than 2*G+1 drives;

reordering the new drives with the first N drives of the minimal drive cluster by swapping disk indices;

freeing cells at N cell indices of the first G-N drives using member transposition; and creating single-cell-index groups in the freed cells.

16. The non-transitory computer-readable storage medium of claim 15 in which the method further comprises expanding the expanded drive cluster with S new drives, resulting in exactly 2*G+1 drives, and freeing cells by relocating remaining original members from S cell indices on the first G drives to the new drives using submatrix transposition.

17. The non-transitory computer-readable storage medium of claim 16 in which the method further comprises creating new single-cell-index protection groups in the freed cells.

18. The non-transitory computer-readable storage medium of claim 17 in which the method further comprises splitting the drive cluster into two split-away clusters and reordering the drives of one of the split-away clusters such that the cell at disk X, cell Y is assigned to group (X+Y−1) modulo M.

19. The non-transitory computer-readable storage medium of claim 15 in which the method further comprises expanding the expanded drive cluster with S new drives, resulting in greater than 2*G+1 drives, and freeing cells by relocating remaining original members from S cell indices on the first W drives to the new drives using submatrix transposition.

20. The non-transitory computer-readable storage medium of claim 19 in which the method further comprises creating new single-cell-index protection groups in the freed cells, splitting the drive cluster into two split-away clusters, adding the remaining new drives to a first split-away cluster of the split-away clusters, reordering the drives of the first split-away cluster such that the cell at disk X, cell Y is assigned to group (X+Y−1) modulo M, freeing cells by relocating remaining original members from S cell indices on the first G-S drives to the new drives using submatrix transposition, and creating new single-cell-index protection groups are created in the freed cells.

* * * * *